United States Patent [19]

Rovner

[11] 3,825,823

[45] July 23, 1974

[54] APPARATUS FOR DETECTING THE DIRECTION OF A MAGNETIC FIELD RELATIVE TO A MARKER DIRECTION BY SEQUENTIALLY SCANNING PLURAL STATIONARY SENSORS

[76] Inventor: Leopold Rovner, 2201 Acacia Park Dr., Cleveland, Ohio 44124

[22] Filed: Jan. 21, 1972

[21] Appl. No.: 219,725

[52] U.S. Cl..................... 324/43 R, 33/361, 33/363
[51] Int. Cl............................................ G01r 33/02
[58] Field of Search ...... 324/43 R, 47; 33/355, 361, 33/363

[56] References Cited
UNITED STATES PATENTS

| | | | |
|---|---|---|---|
| 1,796,295 | 3/1931 | Loth................................ | 324/43 R |
| 2,389,146 | 11/1945 | Fragola et al..................... | 324/43 R |
| 2,770,773 | 11/1956 | Cooley................................. | 324/37 |
| 3,445,761 | 5/1969 | Loughead.............................. | 33/355 |

Primary Examiner—Robert J. Corcoran
Attorney, Agent, or Firm—Woodling, Krost, Granger & Rust

[57] ABSTRACT

An apparatus to detect the direction of an external magnetic field is disclosed incorporating a flux gate magnetometer having a plurality of sensing coil arrays. A scanner sequentially connects each sensing array to a detector to determine the sensing coil system which is in orthogonal alignment with the external magnetic field. A marker device is incorporated into the apparatus to produce an output to the detector when the scanning sequence is in alignment with a marker direction. The apparatus can incorporate a numerical readout to indicate the direction of external magnetic field relative to the marker direction.

14 Claims, 10 Drawing Figures

PATENTED JUL 23 1974

PATENTED JUL 23 1974                                3,825,823

APPARATUS FOR DETECTING THE DIRECTION OF A MAGNETIC FIELD RELATIVE TO A MARKER DIRECTION BY SEQUENTIALLY SCANNING PLURAL STATIONARY SENSORS

BACKGROUND OF THE INVENTION

This invention relates to devices for detecting an external magnetic field and more particularly to a device incorporating sensing means in conjunction with a magnetic material to detect the direction of an external magnetic flux.

A device for detecting the direction of an external magnetic field has been referred to as a compass due to the fact that the magnetic field of the earth is a particular magnetic field of general interest. The compass was one of the earlier discoveries of man and generally included suspending a magnetic material such that the magnetic material would align itself relative to the external magnetic field. The compass has been improved for centuries but the basic principle of operation has been unchanged.

With the advent of electricity into the magnetic field detection art, sensing coils were introduced to operate with a magnetic material to increase sensitivity. These improved devices still possessed the basic disadvantages of the most primitive compasses. The magnetic field detection apparatuses incorporating sensing coils were either limited to the number of directions to which they were sensitive, or they contained moving sensing coils or moving indicator means such as selsyns and the like. The requirement of moving parts in the modern magnetic field detection apparatuses has still remained since the first compasses were used by primitive man. This requirement of moving parts makes the apparatus sensitive to vibrations and to the force of gravity. In addition, the moving parts have to be suspended or some jeweled surface in order to allow free movement of the moving parts.

In order to design a magnetic field detection apparatus which is both sensitive to external magnetic fields and insensitive to vibrations, the moving parts must be freely suspended and damped. A damping of such moving parts reduces the response making the apparatus inadequate for some applications. In an age of supersonic jet aircraft and space shuttles, the response time of a magnetic field detection apparatus is critical in such high speed travel.

Therefore, an object of this invention is to produce a magnetic field detection apparatus having no moving parts.

Another object of this invention is to produce a magnetic field detection apparatus which is insensitive to vibration and has a rapid response time.

Another object of this invention is to produce a magnetic field detection apparatus which is sensitive to all directions in a given plane.

Another object of this invention is to produce a magnetic field detection apparatus capable of producing a display of a marker direction relative to the direction of an external magnetic field.

Another object of this invention is to produce a magnetic field detection apparatus with the capability of time averaging a marker direction output without decreasing the response time of the apparatus.

Another object of the invention is to provide a plurality of sensing coils arranged in different azimuthal directions and scanned in sequence to determine the direction of the earth's magnetic field.

SUMMARY OF THE INVENTION

The invention may be incorporated in an apparatus to determine a marker direction relative to the direction of an external magnetic flux, comprising in combination, core means within the external magnetic flux, means establishing a magnetic flux in said core means, marker means having a change in marker output corresponding to the marker direction, a plurality of sensing means each having a sensing output in response to the flux in said core means, detector means, means applying said marker output to said detector means, scanner means applying each of said sensing outputs to said detector means, and said detector means reacting to said outputs to determine the marker direction relative to the external magnetic flux.

Other objects and a fuller understanding of the invention may be had by referring to the following description and claims, taken in conjunction with the accompanying drawing.

BRIEF DESCRIPTION OF THE DRAWINGS

FIGS. 3 A, B and C illustrate waveforms present at various points in FIG. 1;

DESCRIPTION OF THE PREFERRED EMBODIMENT

Figure 1:
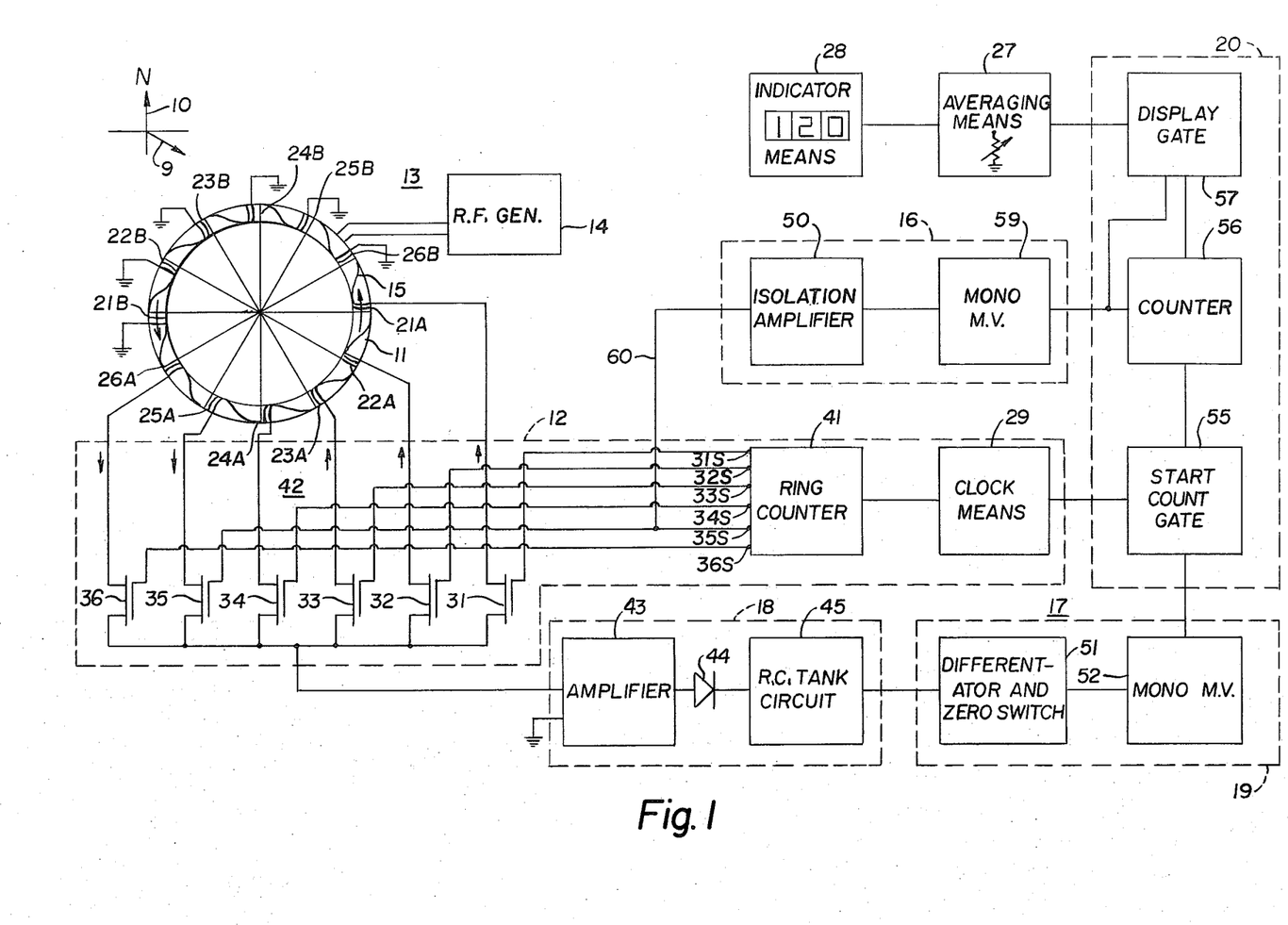
FIG. 1 illustrates a simplified magnetic field detection apparatus in accordance with the disclosed invention.

FIG. 1 illustrates a simplified embodiment of an apparatus to determine a marker direction shown by the arrow 9 relative to the direction of an external magnetic flux shown by the arrow 10. The marker direction 9 is a reference direction or a filar direction. For example, the marker direction 9 may be the axis of a vehicle such as a ship, airplane or space shuttle to indicate the direction of the vehicle relative to an external magnetic field. Similarly, the marker direction 9 may be a filar direction in a surveyor's transit, in a gunsight, or in the view through a telescope. The external magnetic flux 10 can be any magnetic field but in this embodiment the magnetic flux is illustrated as the magnetic field about the Earth with arrow 10 pointing in the northward direction. The apparatus includes core means 11 shown as an annular ring which is located within the external magnetic flux 10. The apparatus also includes means 13 establishing a magnetic flux in the core means 11 which includes a radio frequency generator 14 connected to a primary winding 15 wound about the core means 11 to induce a varying magnetic flux in the core means 11. The frequency of the RF generator 14 is typically between 50 KHz and 500 KHz. The varying magnetic flux established within the core means 11 is established parallel to the circumference of the core means whereas the external magnetic flux 10 is established across the core means 11. The core means 11 can be constructed such that an axis parallel to the circumference is easy to saturate with a small magnitude of magnetic flux whereas an axis perpendicular to the circumference is hard to saturate and requires a large magnitude of magnetic flux to saturate.

The apparatus also includes a plurality of sensing means 21–26 each having a sensing output in response to the flux in the core means 11. The sensing means 21–26 are shown as sensing coil means each having a first and a second coil portion means 21A through 26A and 21B through 26B, respectively. The first and second coil portion means are illustrated as being wound in opposition to one another such that the current produced by the varying magnetic flux within the core means 11 in the first coil portion means is canceled by the current produced in the second coil portion means by the varying magnetic flux. The core means 11 is constructed of a magnetic material such as permalloy and the like which is easily saturated. The RF generator 14 is adjusted to drive the core means 11 into saturation during each half cycle of the RF voltage. For example, at a given instant the varying magnetic flux within the core means 11 is travelling upwardly through the first coil portion means 21A, whereas the magnetic flux is travelling downwardly through the second coil portion means 21B. The external magnetic flux 10 adds to the varying magnetic flux through the first coil portion means 21A but subtracts from the varying magnetic flux through the second coil portion means 21B. Therefore, the magnetic flux through the first coil portion means 21A will saturate before the magnetic flux through the second coil portion means 21B in response to the external magnetic flux 10. When the magnetic flux through the first coil portion means 21A is saturated, the first coil portion means 21A produces no output whereas the second coil portion means 21B is still in the process of reaching saturation and is still producing an output. Therefore the sum of the first and second coil portion means 21A and 21B no longer cancels but produces an output which is approximately proportional to the strength of the external magnetic flux 10. For a fuller discussion, the reader is invited to read R. D. Wyckoff Gulf Airborne Magnetometer, Geophysics 13 182–208, 1948.

Figure 2:
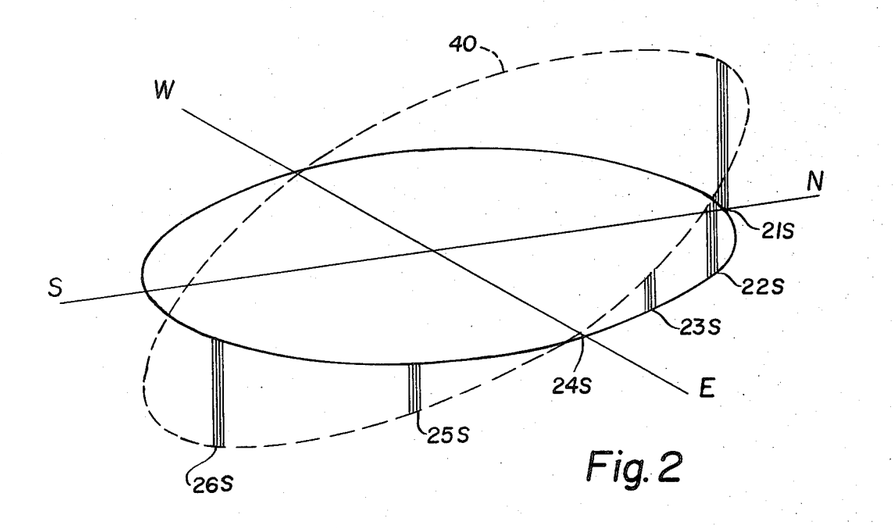
FIG. 2 illustrates the output of the sensing means as a function of an external magnetic field.

FIG. 2 shows the outputs of the sensing means 21–26 of FIG. 1 in relation to the direction of the external magnetic flux 10. The sensing means 21 which is wound about an axis parallel to the external magnetic flux 10 has the maximum positive signal output as illustrated by the output pulses 21S. The sensing means 22 has a reduced output 22S since only a component of the external magnetic flux 10 affects the saturation of the core means 11 at the locations of the coil portion means 22A and 22B. The output 23S of the sensing means 23 is reduced relative to the output 22S of the sensing means 22 since the component of the external magnetic field 10 aiding and hindering saturation of the core means 11 at the first and second coil portion means 23A and 23B, respectively, is reduced. The sensing means 24 has a zero output 24S since the external magnetic flux does not aid in saturation. The output 25S of the sensing means 25 is negative relative to the output signals 21S–23S. This change in polarity is illustrated in FIG. 1 by the winding directions of the sensing means 21–26 and the arrows indicating current flow. The output 26S of the sensing means 26 is increased relative to the output 25S of the sensing means 25.

The core means 11 shown in FIG. 1 has only six sensing means which are able to interrogate only six directions. Only six directions were interrogated on FIG. 1 for the sake of simplicity but in actual practice many more directions are interrogated in order to determine more accurately the direction of external magnetic field. A sufficient number of sensing means to enable interrogation to accuracies of degrees or fractions thereof would be more appropriate for actual operation. The resultant output of a large number of sensing means is illustrated by line 40 in FIG. 2.

The apparatus shown in FIG. 1 also includes scanner means 12 and detector means 17. The scanner means 12 applies each of the outputs of the sensing means 21–26 to the detector means 17. The detector means 17 includes input means 18, connector means 19 and counter means 20. The input means 18 includes an amplifier 43 connected to an R.C. tank circuit 45 by a rectifier 44. The scanner means 12 sequentially connects each of the sensing means to the detector means 17. The scanner means is shown as including clock means 29, a ring counter 41 and a multiplexer 42. The multiplexer 42 is shown as an array of solid state switching device 31–36 which sequentially connect the sensing means 21–26 to the amplifier 43 of the input means 18. The solid state switching devices 31–36 can be FET or MOS-FET transistors wherein the channels thereof are interconnecting the amplifier 43 and each of the sensing means 21–26. The gate of each of the solid state switching means 31–36 is connected to the ring counter 41. The clock means 29 which can be an electronic or a mechanical oscillator, produces an output which is applied to the ring counter 41 to control the progression rate of the ring counter. For example, when the clock means 29 produces a pulse to the ring counter 41, a gate signal is generated at terminal 31S and applied to switch means 31. The switch means 31 turns on, interconnecting the sensing means 21 to the amplifier 43. The next pulse from the clock means 29 indexes the ring counter 41 producing a gate signal at terminal 32S turning on switch means 32 thereby interconnecting the sensing means 22 to the amplifier 43. Another pulse from the clock means 29 produces a gate signal 33S which interconnects the sensing means 23 to the amplifier 43. The connection sequence continues until switch means 36 has been energized whereat the sequence begins again with switch means 31. The gating signal 35S is also applied to an isolation amplifier 50.

Figure 3A:
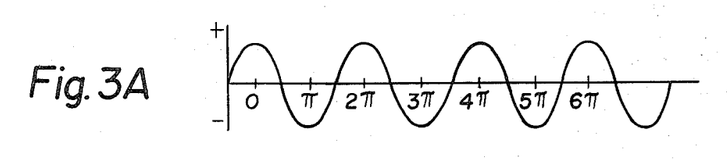
Figure 3B:
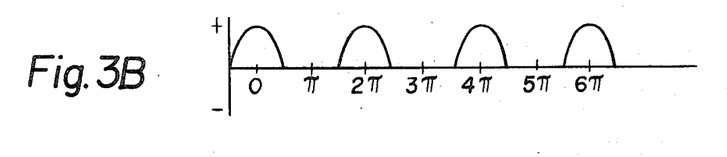
Figure 3C:
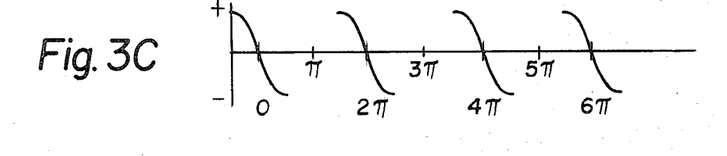

FIG. 3A illustrates the pulse envelope applied to the amplifier 43 from sensing means having a resultant output as shown by line 40 in FIG. 2. The maximum pulses will occur when a sensing means is wound about an axis in the direction of the external magnetic flux; e.g., sensing means 21 in FIG. 2. The output of amplifier 43 is rectified by a rectifier 44 and the output thereof is channeled into an RC tank circuit 45. The output of the RC tank circuit 45 is shown in FIG. 3B. The frequency of the RF generator 14 and the clock means 29 can be selected such that a plurality of output pulses from each sensing means is applied to the amplifier 43 during the gating of the respective switch means. In this arrangement, the RC tank circuit 45 averages the amplitude of the plurality of pulses as shown in FIG. 2. The output of the RC tank circuit 45 is applied to the connector means 19 which is responsive to the rate of change of the RC tank circuit output. The connector means 19 is shown to include a differentiator and a zero switch state 51 connected to a monostable multivibrator 52. The differentiator has an output shown in FIG. 3C. When the output of the differentiator reaches a zero level indicating a maximum of the output emanating from the RC tank circuit 45, the zero switch within stage 51 triggers the monostable multivibrator 52. The differentiator and zero switch can be discrete devices or can be combined into a single stage such as a peak detector and the like.

The counter means 20 includes a start gate 55, a counter 56 and a display gate 57. The output from the monostable multivibrator 52 energizes the start gate 55 to apply the pulses from the clock means 29 to the counter 56 thereby counting the scanning sequence of the ring counter 41. A marker means 16 includes the isolation amplifier 50 connected to a monostable multivibrator 59. The marker means 16 establishes the marker direction 9 or reference direction in the circuitry shown in FIG. 1. When the ring counter 41 generates a gating signal 35S which corresponds to the marker direction 9, the isolation amplifier 50 triggers the monostable multivibrator 59. The monostable multivibrator 59 is connected to the counter 56 and the display gate 57 such that a change in marker output from the multivibrator 59 of the marker means 16 stops the count in the counter 56 and energizes the display gate 57. The isolation amplifier 50 is connected to the ring counter 41 by a conductor 60 to enable a change in marker output of the marker means 16 when the ring counter 41 produces the gating signal 35S. The change in marker output can be a signal or an absence of signal to the counter 56. The marker means 16 is connected to the ring counter 41 but does not form a part of the sensing means or core means. The marker means 16 functions to produce a change in marker output when a gate signal from the ring counter 41 energizes a sensing means which corresponds to a marker direction.

Figure 7:
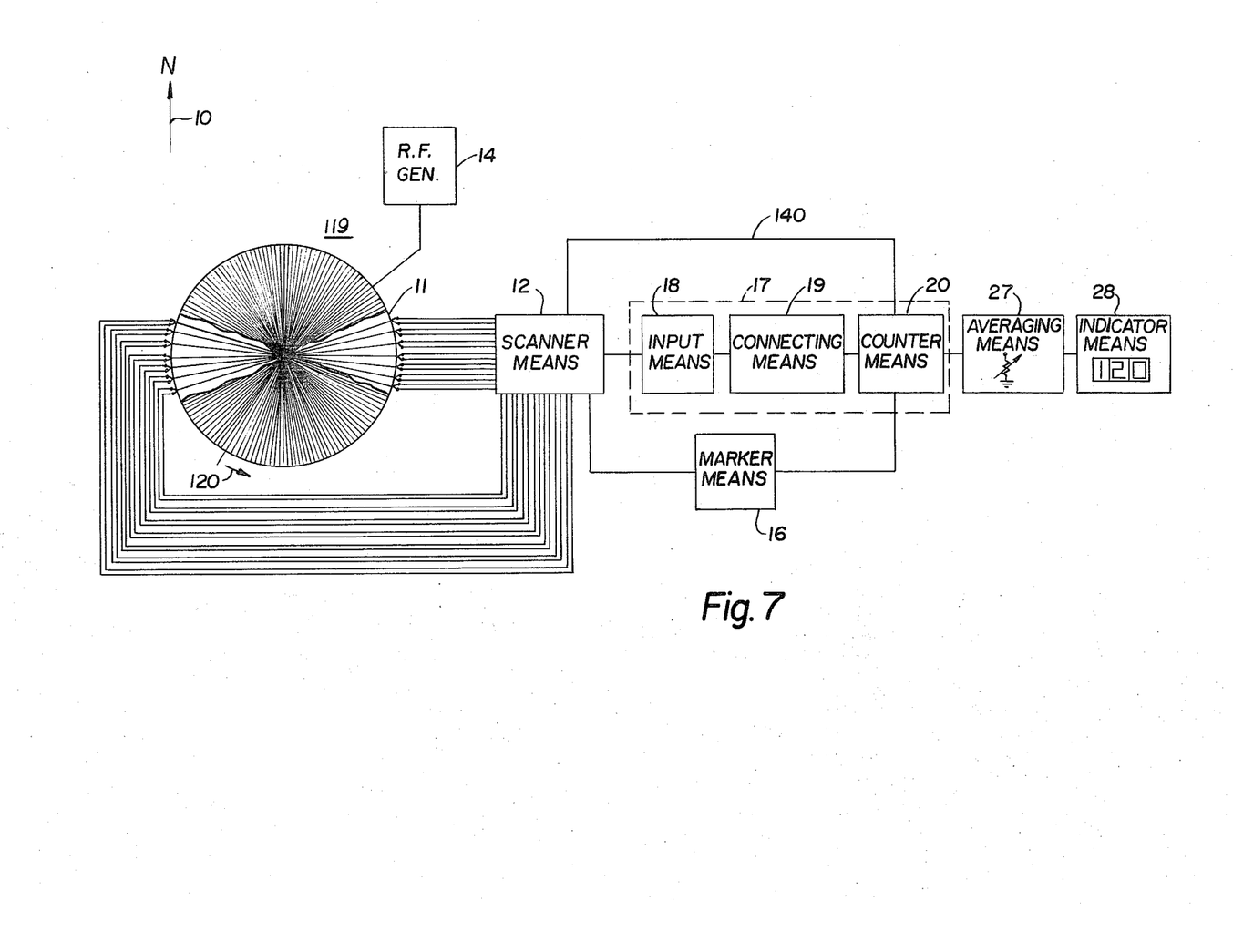
FIG. 7 illustrates the preferred embodiment of the present invention.

The output of the display gate 57 is entered into an averaging means 27 which can either be a digital or analog device wherein the output of the display gate 57 is time averaged over a selected period of time before being displayed by an indicator means 28. The averaging means 27 controls the response of the indicator means 28 and is shown able to vary the span of the time average of response of the indicator means 28. The averaging means 27 can average the signal from the display gate 57 over a period of time selected by an operator. For example, assuming the apparatus of FIG. 1 is mounted on a small boat and the display gate 57 is releasing a new output signal to the indicator means 28 every 20 milliseconds, then the indicator means 28 would produce a rapidly changing last digit when the boat was in rough sea making the last digit unreadable. The averaging means 27 can be selected to average the angle signal input of the preceding 5 seconds, for example, in which case the averaging means 27 will continuously average the output of the counter. With the 5-second averaging period, the indicator means 28 will continuously present a smooth output representative of a five second average direction of boat heading. The averaging means 27 has been shown to be variable to enable extremely rapid averaging for smooth operation such as space shuttles and for slow averaging for erratic operation. Although the averaging means 27 is shown in FIGS. 1 and 7 to be located between the counter means 20 and the indicator means 28, it is understood that an averaging means 27 could be located in other places between the sensing means and the indicator means 28. For example, the averaging means 27 can be located between the counter 56 and the display gate 57. In this arrangement the averaging means 27 is selected to average the output of the counter 56 during a predetermined time which average is introduced through the display gate 57 to the indicator means 28 each time the marker direction is scanned. Assuming the display gate 57 releases a signal to the indicator means 28 every 20 milliseconds, then the averaging means 27 can be selected to average over a period of 200 milliseconds, for example. Consequently, the display gate 57 will be continuously up-dating information to the indicator means 28 every 20 milliseconds based on the average of the most recent 200 millisecond period. The indicator means 28 is illustrated as a digital indicating means but can be any type of indicator suitable for a given use. In addition, the output of the display gate 57 can be used for a control device such as an automatic pilot and the like.

The connector means 19 illustrated in FIG. 1 is responsive to the maximum positive signal of the RC tank circuit 45 which corresponds to the direction of the external magnetic flux. However, the connector means 19 can be replaced by a device sensitive to a given slope or a zero point of the output of the RC tank circuit 45. Accordingly, the counter 56 would have to be adjusted for a count starting at a point other than the positive direction of the external magnetic flux. The selection of the marker direction illustrated by arrow 9 and represented by the sensing means 25 in FIG. 1 is completely arbitrary in that the conductor 60 can be connected to any of the output terminals 31S–36S of the ring counter 41. However, the marker direction 9 should correspond to some physically meaningful direction such as the axis or lubberline of a vehicle or craft, or a filar line in a surveyors transit, or the optical axes of a binocular set, and the like.

Figure 4:
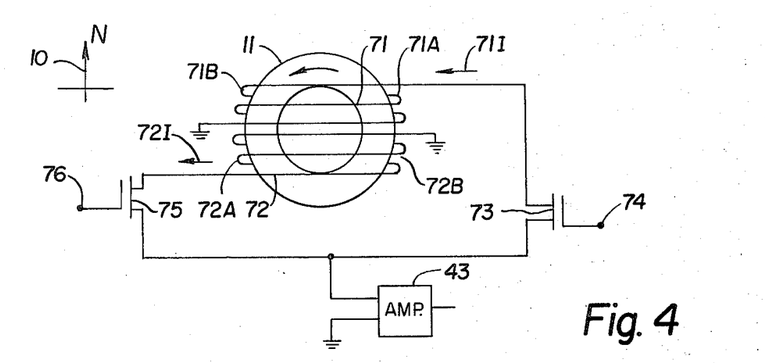
FIG. 4 illustrates sensing means which is suitable for use with the apparatuses shown in FIGS. 1 and 7.

FIG. 4 illustrates core means 11 and sensing means 71 and 72. The sensing means 71 and 72 are shown as sensing coil means wound opposite to one another and each having a first and second coil portion means 71A, 72A and 71B, 72B, respectively. When the internal magnetic flux is travelling in a direction indicated by the arrow in the core means 11 and the external magnetic flux is pointing in a direction indicated by the arrow 10, then the right half of the core means 11 will saturate before the left half causing a current output in the sensing coil means 71 and 72 in accordance with the arrows 71I and 72I, respectively. The sensing means 71 is connected to the amplifier 43 by a switch means 73 controlled by a gate 74 whereas the sensing means 72 is connected to the amplifier 43 by switch means 75 having gate 76. A gate signal from the scanner means 12 shown in FIGS. 1 and 7 will energize the gate of switch means 73 to apply the output of sensing means 71 to the amplifier 43. Subsequently the scanner means will energize gate 76 of switch means 75 to apply the output of sensing means 72 to amplifier 43. In the illustration shown in FIG. 4 the sensing means 71 and 72 are able to detect directions 180° relative to one another. The embodiment shown in FIG. 1 was able to interrogate only six directions each coil interrogating a single direction. Therefore, only half of 12 sensing means are illustrated in FIG. 1 for the sake of simplicity.

In actual practice each sensing means, for example, 21 would be replaced by a paired sensing means as shown in FIG. 4. The ring counter would then have 12 outputs of scan in 12 directions throughout 360° in 30° increments. If a greater accuracy is desired, then additional sensing means must be added. For each of the two directions along a given line, a pair of sensing means and switch means must be used as illustrated in FIG. 4.

Figure 5:
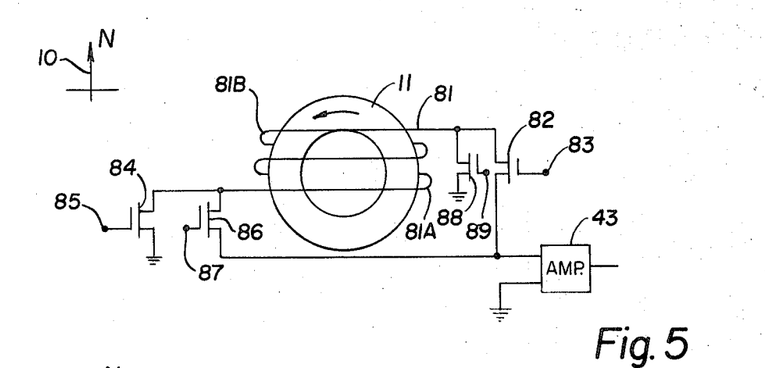
FIG. 5 illustrates a variation of the sensing means which is suitable for use with the apparatuses shown in FIGS. 1 and 7.

FIG. 5 shows a single sensing means 81 wound around core means 11 and having a first and a second coil portion means 81A and 81B, respectively. A gate signal from the scanner means 12 is applied to both the gates 83 and 85 of switch means 82 and 84 to connect the sensing means 81 to the amplifier 43 in a manner similar to the sensing means 71 shown in FIG. 4. Subsequently, a gating pulse applied to both the gates 87 and 89 of switch means 86 and 88 connects the sensing means 81 to the amplifier 43 in a manner similar to the sensing means 72 shown in FIG. 4. Therefore, by the addition of two switch means in FIG. 5, only one-half the number of coils is required in comparison with FIG. 4 since the sensing means 81 is electrically inverted.

Figure 6:
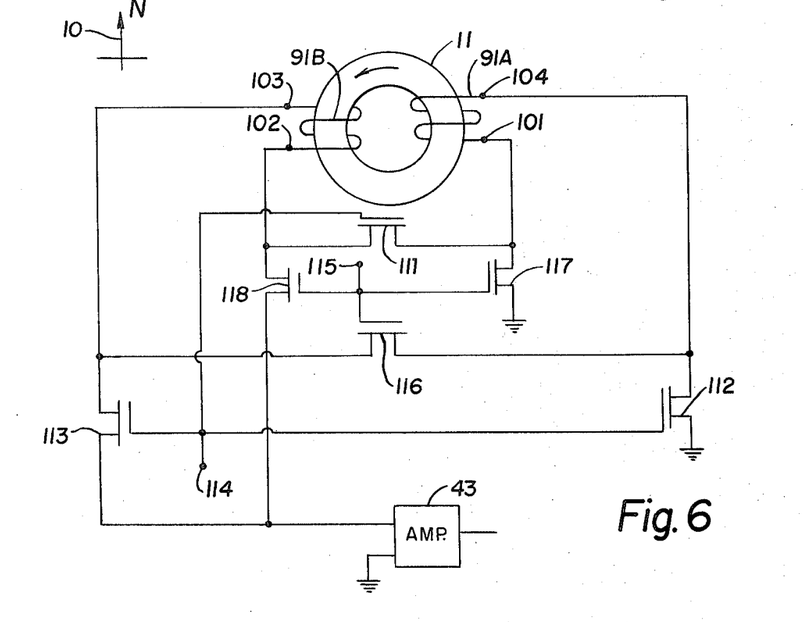
FIG. 6 shows still another variation of the sensing means which is suitable for use with the apparatuses shown in FIGS. 1 and 7.

FIG. 6 illustrates an annular core means 11 similar to the core means 11 shown in FIG. 1 and sensing means 91 having a first and a second coil portion means 91A and 91B which are similar to the coil portion means 21A and 21B shown in FIG. 1. However, in FIG. 1 the first coil portion means 21A is directly interconnected with the second coil portion means 22B. The first and second coil portion means 91A and 91B each has a first and second terminal 101–104. When a gate signal is applied to the switch means 111–113 through a common terminal point 114 from the ring counter 41, terminals 101 and 102 are interconnected whereas terminals 103 and 104 are connected to the input of amplifier 43. When a subsequent gating signal is applied to terminal 115, the switch means 116–118 interconnect terminals 103 and 104 and apply terminals 101 and 102 to amplifier 43. Therefore, the scanner means 12 of FIG. 1 sequentially interconnects one of the terminals of each of the first and second coil portion means and connects the other of the terminals of each of the first and second coil portion means to the input means 18. The scanner means subsequently interconnects the other terminals of each of the first and second coil portion means and connects said one of the terminals of each of the first and second coil portion means to the input means 18. In this embodiment the addition of five switch means over the one switch means required in FIG. 1 enables the sensing means 91 to interpret two directions eliminating half of the coil requirements of the embodiment shown in FIG. 1. The various types of sensing coil means shown in FIGS. 4–6 can be used with either an annulus or a disc-type core means. The annulus can be a toroid or a ring or the like. The advantages of FIGS. 5 and 6 include a reduction of one-half of the coil requirements of FIGS. 1 and 4. However, the switching circuits in FIGS. 5 and 6 are more complex.

FIG. 7 is a preferred embodiment of the present invention including core means 11 within the external magnetic flux 10.

The RF generator 14 establishes a magnetic flux in the core means 11. The preferred embodiment also shows a plurality of sensing means 119 connected to the scanner means 12 each having an output in response to the flux in the core means 11. The detector means 17 includes the input means 18, the connector means 19 and the counter means 20. The scanner means 12 sequentially applies the sensing outputs of each of the sensing means 119 to the input means 18 of the detector means 17. The detector means 17 in response to the output of the sensing means 119, energizes the counter means 20 to commence counting the scanning sequence of the scanner means 12. The scanning sequence of the scanner means 12 is transmitted to the counter means 20 by conductor 140. When the scanner means 12 connects a sensing means corresponding to the marker direction 120, the marker means 16 has a change in output which is applied to the counter means 20 to stop counting and to display the count into the averaging means 27. The averaging means 27 time averages the counter means output before transferring the marker direction relative to the external magnetic flux to the indicator means 28. The large number of sensing means 119 shown in FIG. 7 in part determines the quality of angular resolution of the apparatus. If an extremely high angular resolution is required, then several sensing means per degree might be used whereas in general applications one sensing means per many degrees may be sufficient. In order to simplify the drawing, not all of the sensing means 119 are shown connected in FIG. 7. The connecting means 19 includes a device for interpolating which the apparatus is being operated with a relatively few number of sensing means. For example, an apparatus using 12 sensing means would apply a signal to the input means 18 corresponding to every 15° of scan. The connecting means 19 would interpolate the information received every 15° and determine the magnetic field direction in units of degrees or smaller. All of these variations are within the breadth of the described invention.

Figure 8:
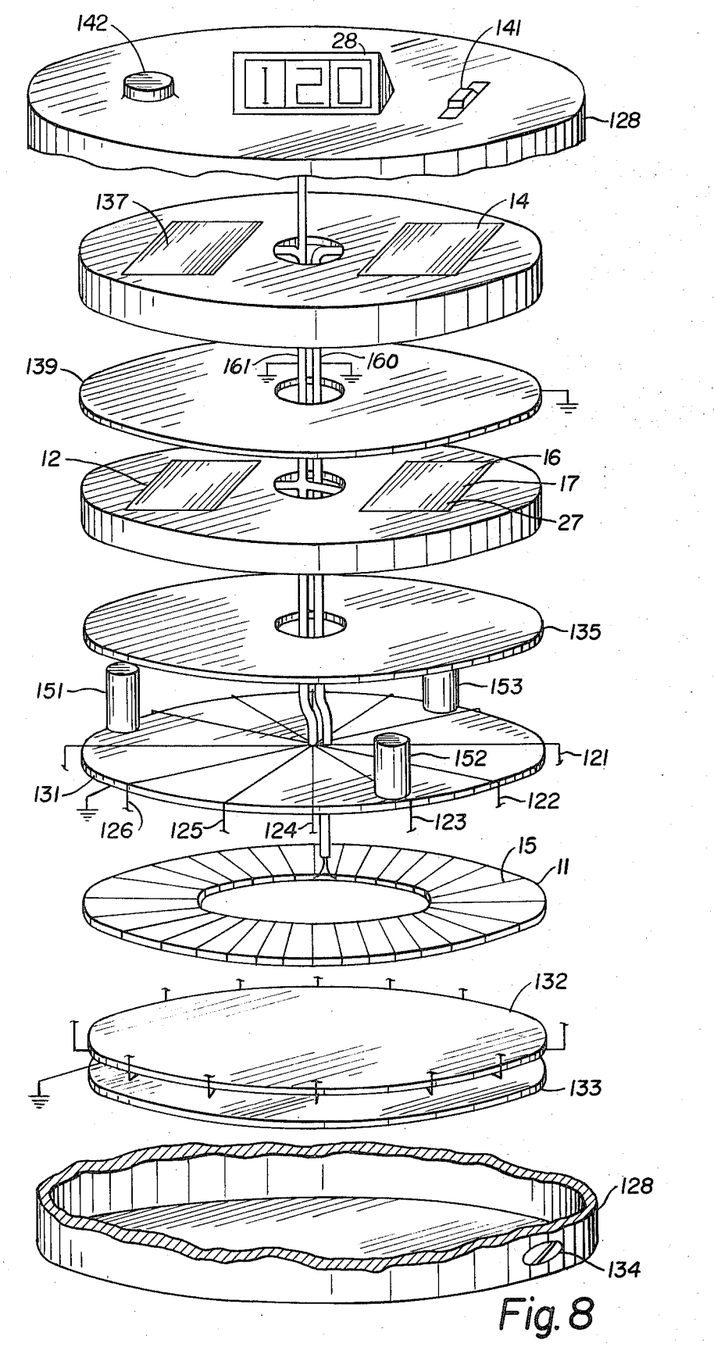
FIG. 8 shows an exploded view of a practical construction of the invention.

FIG. 8 illustrates one practical construction of the disclosed invention. The apparatus is contained within a housing 128 which is sectioned to illustrate an exploded view of the apparatus contained therein. The core means 11 is shown as an annulus of permalloy having the primary winding 15 wrapped therearound as a toroidal winding. The core means 11 is adjacent to two electrostatic shields 131 and 132 which are in closed proximity to the core means 11 to isolate the sensing means from electrostatic fields and noises. These shields could be any conductor such as copper and the like. The bottom electrostatic shield 132 is connected to a support ring 133 which rests upon the bottom of the housing 128. A screw 134 is used to secure the bottom ring relative to the housing 128. The sensing means 121–126 are wrapped about the core means 11 in the type of winding arrangement illustrated in FIGS. 4 and 5. The connections to the sensing means 121–126 and the primary winding 15 are passed through an electromagnetic shield 135 to the respective electronic circuitry. The electromagnetic shield 135 is spaced from the core means 15 by spacers 151–153 to avoid distortion of the magnetic flux sensed by the core means 15. The electromagnetic shield 135 can be Mu metal or the like. The conductors connecting the sensing means 121-126 and the winding 15 to the respective electronic circuits are shown as shielded by shielded cables 161 and 160, respectively. Immediately above the electromagnetic shield 135 is the scanner means 12, the detector means 17, the marker means 16 and the averaging means 27. Immediately above an electrostatic shield 139, the RF generator 14 is situated with a power supply 137. The power supply can either be a battery or a voltage change circuit to enable the device to be operated from an external power source. The radio frequency generator 14 is isolated from the remaining circuitry by the electrostatic shield 139. The output of the averaging means 27 is applied to the indicator means 28 which is illustrated as a digital readout on top of the housing 128. The housing 128 has a switch 141 to control the power to the apparatus and a control device 142 to vary the averaging means 27.

The housing is secured to a vehicle or craft relative to an axis or reference direction thereof. The screw 134 is disengaged allowing the rotation of the bottom ring 133 and the constituents mounted thereon. This rotation allows the sensing means corresponding to the marker direction to be established relative to the vehicle or craft upon which the housing is mounted. This rotation can be accomplished electronically by changing the connection of the conductor 60 to a different output terminal of the ring counter 41 shown in FIG. 1.

Although the electronic stages and logic shown in FIG. 1 and the physical construction illustrated in FIG. 8 have been described in a great degree of particularity, these descriptions have been included as an example of a particular application of the disclosed invention and are not to be construed as a limitation thereof.

The function of the electronic stages shown in FIGS. 1 and 7 can be reproduced by electronic circuits having a multitude of variations over those described in FIGS. 1 and 7 and such variations are considered to be within the scope and spirit of the disclosed invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus to determine a marker direction relative to the direction of an external magnetic flux, comprising in combination,
    core means within the external magnetic flux,
    means establishing a magnetic flux in said core means,
    a plurality of sensing means,
    means magnetically coupling each of said sensing means to said core means to have a sensing output in response to the flux in said core means,
    detector means,
    scanner means for sequentially connecting each of said sensing outputs to said detector means,
    marker means cooperating with said scanner means to have a change in marker means output corresponding to the marker direction,
    and means for applying said marker means output to said detector means to determine the marker direction relative to the external flux.

2. An apparatus as set forth in claim 1, including indicator means indicating the marker direction relative to the direction of the external magnetic flux.

3. An apparatus as set forth in claim 2, wherein said indicator means includes digital indicator means.

4. An apparatus as set forth in claim 2, including averaging means connected between said sensing means and said indicator means to control the response of said indicator means.

5. An apparatus as set forth in claim 1, including averaging means to time average the output of said detector means.

6. An apparatus to determine a marker direction relative to the direction of an external magnetic flux, comprising in combination,
    core means within the external magnetic flux,
    means establishing a varying magnetic flux in said core means,
    a plurality of sensing coil means,
    means magnetically coupling each of said sensing means to said core means to have a sensing output in response to the flux in said core means,
    detector means including input means and counter means,
    scanner means sequentially connecting each of said sensing coil means to said input means,
    means connecting said input means to said counter means to commence counting the sequence of connection of said scanner means in response to a sensing output of one of said sesing coil means,
    and marker means connected to said counter means to terminate counting when the sequence of connection corresponds to the marker direction.

7. An apparatus as set forth in claim 6, wherein said means connecting said input means to said counter means includes means responsive to the rate of change of said sensing outputs of said sensing coil means.

8. An apparatus as set forth in claim 6, wherein said means connecting said input means to said counter means includes differentiator means.

9. An apparatus as set forth in claim 6, wherein each of said sensing coil means includes first and second coil portion means.

10. An apparatus as set forth in claim 9, wherein each of said first and second coil portion means has a first and a second terminal,
    and said scanner means interconnects one of said terminals of each of said first and second coil portion means and connects the other of said terminals of each of said first and second coil portion means to said input means and subsequently interconnects said other terminals of each of said first and second coil portion means and connects said one of said terminals of each of said first and second coil portions means to said input means.

11. An apparatus as set forth in claim 10, wherein the apparatus has a number of sensing coil means equal to one half the number of unique directions to be scanned.

12. An apparatus as set forth in claim 9, wherein said scanner means first connects said sensing coil means to said input means and secondly connects said sensing coil means to said input means to have an opposite electrical polarity relative to said first connection.

13. An apparatus to determine a marker direction relative to the direction of an external magnetic flux, comprising in combination,
a plurality of sensing means each having a sensing output in response to the direction of the external magnetic flux,
detector means,
scanner means sequentially connecting each of said outputs of said sensing means to said detector means,
marker means having a change in marker output corresponding to the scanning of the one of said sensing means in the marker direction,
and means for connecting said marker means to said detector means to determine the angular difference between the marker direction and the direction of the external magnetic flux in accordance with said connection sequence between these directions.

14. An apparatus as set forth in claim 1, wherein said external magnetic field is an ambient magnetic field.

* * * * *